(12) United States Patent
Nilsson

(10) Patent No.: US 11,541,723 B2
(45) Date of Patent: Jan. 3, 2023

(54) THERMAL MANAGEMENT FOR ELECTRICAL DRIVE SYSTEMS

(71) Applicant: BorgWarner Sweden AB, Landskrona (SE)

(72) Inventor: Kristoffer Nilsson, Lund (SE)

(73) Assignee: BorgWarner Sweden AB, Landskrona (SE)

( * ) Notice: Subject to any disclaimer, the term of this patent is extended or adjusted under 35 U.S.C. 154(b) by 330 days.

(21) Appl. No.: 16/067,962

(22) PCT Filed: Jan. 3, 2017

(86) PCT No.: PCT/EP2017/050078
§ 371 (c)(1),
(2) Date: Jul. 3, 2018

(87) PCT Pub. No.: WO2017/118629
PCT Pub. Date: Jul. 13, 2017

(65) Prior Publication Data
US 2019/0160914 A1    May 30, 2019

(30) Foreign Application Priority Data
Jan. 7, 2016   (SE) .................................. 1650016-7

(51) Int. Cl.
*B60H 1/14*   (2006.01)
*B60K 11/02*  (2006.01)
*B60K 1/00*   (2006.01)
*B60L 3/00*   (2019.01)

(52) U.S. Cl.
CPC .................. *B60H 1/14* (2013.01); *B60K 1/00* (2013.01); *B60K 11/02* (2013.01); *B60L 3/0046* (2013.01); *B60K 2001/003* (2013.01); *B60L 2240/36* (2013.01)

(58) Field of Classification Search
CPC .... B60H 1/14; B60K 11/02; B60K 2001/003; B60L 3/00; B60L 3/0046; B60L 2240/36; F01P 2060/045
See application file for complete search history.

(56) References Cited

U.S. PATENT DOCUMENTS

| | | | |
|---|---|---|---|
| 5,291,960 A | 3/1994 | Brandenburg et al. | |
| 2004/0069546 A1* | 4/2004 | Lou .......................... | B60K 6/22 180/65.21 |
| 2005/0167169 A1 | 8/2005 | Gering et al. | |
| 2011/0284309 A1 | 11/2011 | Gooden et al. | |
| 2014/0262135 A1 | 9/2014 | Sheppard et al. | |

(Continued)

FOREIGN PATENT DOCUMENTS

| | | | |
|---|---|---|---|
| DE | 4238364 A1 | 5/1994 | |
| WO | 2013054831 A1 | 4/2013 | |
| WO | WO-2013054831 A1 * | 4/2013 | ............... B60K 6/48 |

*Primary Examiner* — Harry E Arant
(74) *Attorney, Agent, or Firm* — Brooks Group, PLC

(57) ABSTRACT

The present invention concerns a method of thermal management of a transmission of an axle (4) of an electrical vehicle and a circuit used for the method. The circuit comprises a coolant pump (1), one or more on-board units, a three way valve (5) and the axle (4), which axle (4) comprises a transmission. Coolant of a cooling system of the vehicle is made to pass the on-board units to pick up heat losses. The on-board units may be power electronics (2), an electrical machine (3), a battery and/or an on-board charger.

11 Claims, 3 Drawing Sheets

(56) References Cited

U.S. PATENT DOCUMENTS

| | | | |
|---|---|---|---|
| 2016/0105083 A1* | 4/2016 | Ishimaru | H02K 5/22 |
| | | | 310/54 |
| 2016/0318409 A1* | 11/2016 | Rawlinson | B60L 1/02 |
| 2017/0144532 A1* | 5/2017 | Tokozakura | B60L 50/16 |

* cited by examiner

THERMAL MANAGEMENT FOR ELECTRICAL DRIVE SYSTEMS

This application claims the benefit of Swedish Application No. 1650016-7 filed Jan. 7, 2016 and PCT Application No. EP2017/050078 filed Jan. 3, 2017.

TECHNICAL FIELD

The present invention concerns a method for thermal management of electrical drive systems and a circuit for implementation of the method.

BACKGROUND

In electrical vehicles the drivetrain efficiency is very important since all energy lost will need to be compensated by a larger battery at a high cost to achieve the specified driving range.

Losses in transmission are temperature dependent. The losses tend to be higher at lower temperatures due to higher oil viscosity and other factors. Since most real driving and also certification cycles starts with the transmission at ambient temperature (for example 20° C.) and are short in length the rate of temperature increase in the transmission will have a significant impact on the average transmission temperature and thus the average efficiency.

SUMMARY

One purpose of the present invention is to use heat losses of some on-board units of an electrical vehicle to control the temperature of the transmission of an axle of the vehicle. One object is to use the heat losses generated by the on-board units, such as the power electronics and the electrical machine to heat up the transmission and thus achieve a higher average temperature and by that higher average efficiency.

The thermal management system of the invention uses the normal cooling system of the vehicle and coolant of the cooling system is made to pass the on-board units.

The system is designed with a 3-way control valve to avoid that the coolant is circulated to the transmission when it is close to its operating temperature. This will protect the electrical machine and the power electronics having a lower temperature limit (typically max 65° C.) from the potentially higher transmission temperature at for example sporty driving (over 100° C.). In a third operation mode, some flow is diverted to the transmission to provide cooling while maintaining the coolant circuit below the temperature limits of the electrical machine and the power electronics.

Also other heat sources, as for example the on board charger or the battery, can in similar manner be used to heat the transmission. One additional benefit of using the on-board charger heat is that the transmission can be heated when charging and thus start at an elevated temperature already when starting to drive.

The axle is always included in the circuit. Coolant can be circulated in the unit for heating up or to the front cooler for cooling. This will increase the demands on the front cooler since heat from the axle always needs to be cooled off to provide low enough return temperature for the power electronics.

The thermal management system has three operation modes. One operation mode for heating of the transmission of the axle, one operation mode during normal driving and one operation mode for cooling of the transmission of the axle.

Further objects and advantages of the invention will be obvious to a person skilled in the art when reading the detailed description below of embodiments of the present invention.

BRIEF DESCRIPTION OF THE DRAWINGS

The invention will be described further below by way of example and with reference to the enclosed drawings. In the drawings.

DETAILED DESCRIPTION OF EMBODIMENTS

Figure 1:
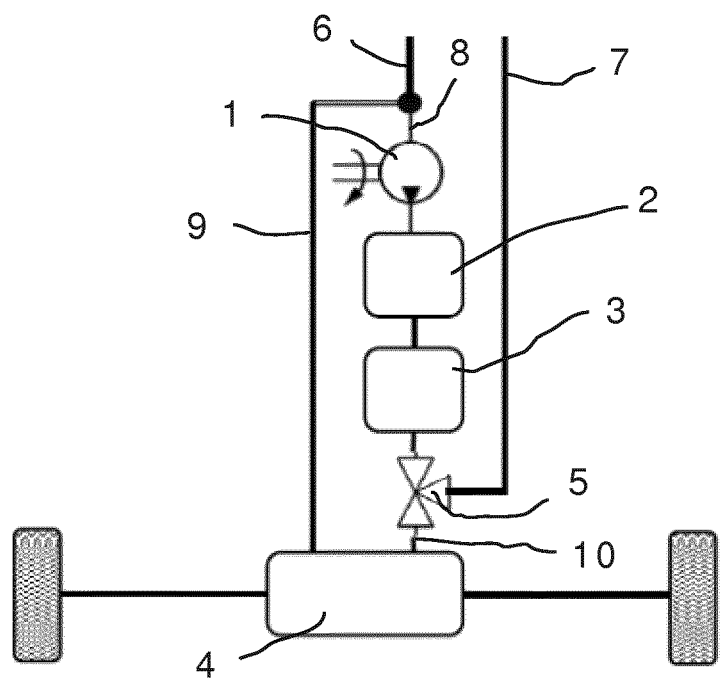
FIG. 1 is a circuit diagram of one embodiment of the thermal management system of the present invention, FIG. 2 corresponds with FIG. 1 showing the thermal management system in a heating up phase, FIG. 3 corresponds with FIG. 1 showing the thermal management system during normal operation, FIG. 4 corresponds with FIG. 1 showing the thermal management system in a phase of transmission cooling.

The thermal management system of FIG. 1 comprises a coolant pump 1, power electronics 2, an electrical machine 3, an axle 4, having a transmission, and a three way valve 5. Coolant flow, normally water, is introduced via an incoming flow line 6. The incoming coolant flow comes from the cool side of the ordinary cooling system of the vehicle. The coolant flow is fed out of the thermal management system via an outgoing flow line 7. The outgoing coolant flow goes back to the hot side of the ordinary cooling system of the vehicle.

In some embodiments oil is used instead of water as coolant in the thermal management system of the present invention. If oil is used a heat exchanger for water/oil is often used.

The coolant of the thermal management system is circulated by means of the coolant pump 1. The incoming flow line 6 is divided into a first flow line 8 going to the coolant pump 1 and a second flow line 9 going directly to the axle 4. The first flow line 8 goes from the coolant pump 1, via the power electronics 2, via the electrical machine 3 and then to the three way valve 5. The order of placement of the coolant pump 1, the power electronics 2 and the electrical machine do not need to be as shown in FIG. 1. Thus, the electrical machine 3 may for instance be placed between the coolant pump 1 and the power electronics 2. In addition to be connected to the first flow line 8, the three way valve 5 is also connected to the outgoing flow line 7 and a third flow line 10 going to the axle 4.

Figure 2:
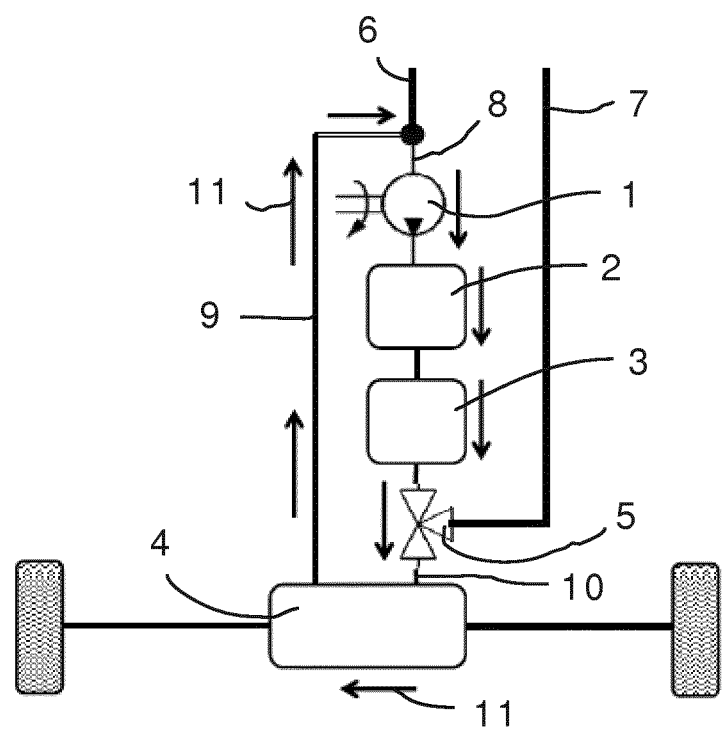

During a heating up phase the three way valve 5 leads all coolant flow from the first flow line 8 via the third flow line 10 to the axle 4. The flow then goes from the axle 4 back to the coolant pump 1 via the second flow line 9. The direction of flow is indicated by arrows 11 in FIG. 2. The flow picks up heat from the power electronics 2 and the electrical machine 3 to heat up the transmission of the axle 4.

Figure 3:
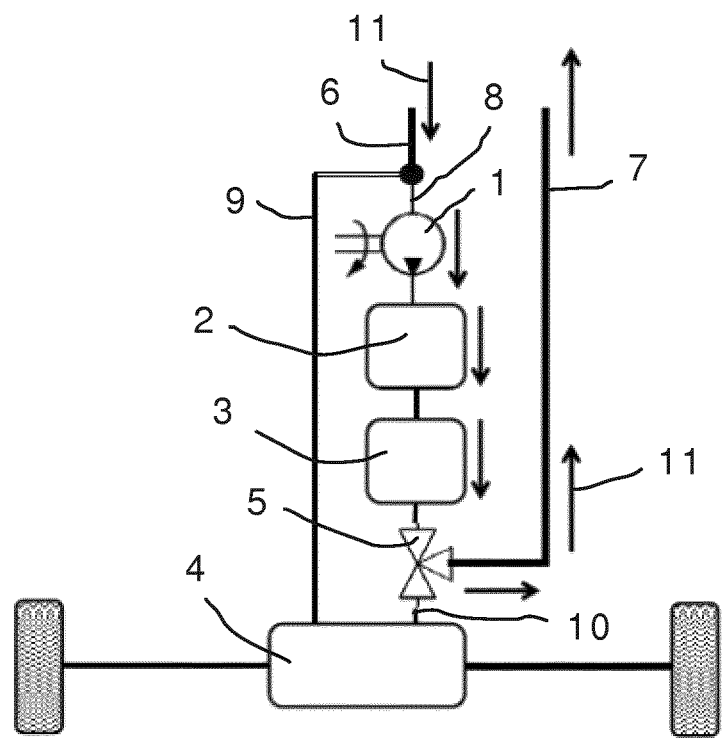

During normal operation the three way valve 5 leads all coolant flow from the first flow line 8 directly to the outgoing flow line 7. Thus, during normal operation the flow goes only via the power electronics 2 and the electrical machine 3 directly back to the cooling system of the vehicle, without passing the axle 4. The direction of the coolant flow during the normal operation is indicated by arrows 11 in FIG. 3. The normal operation mode is used when the temperature of the transmission of the axle 4 is close to its operating temperature. The normal operation mode will protect the power electronics 2 and the electrical machine 3, if the temperature of the transmission of the axle 4 is higher than wanted for the power electronics 2 and the electrical machine 3. Typically the maximal temperature of the power electronics 2 and the electrical machine 3 is about 65° C. Depending on the driving condition the temperature of the transmission may be over 100° C.

Figure 4:
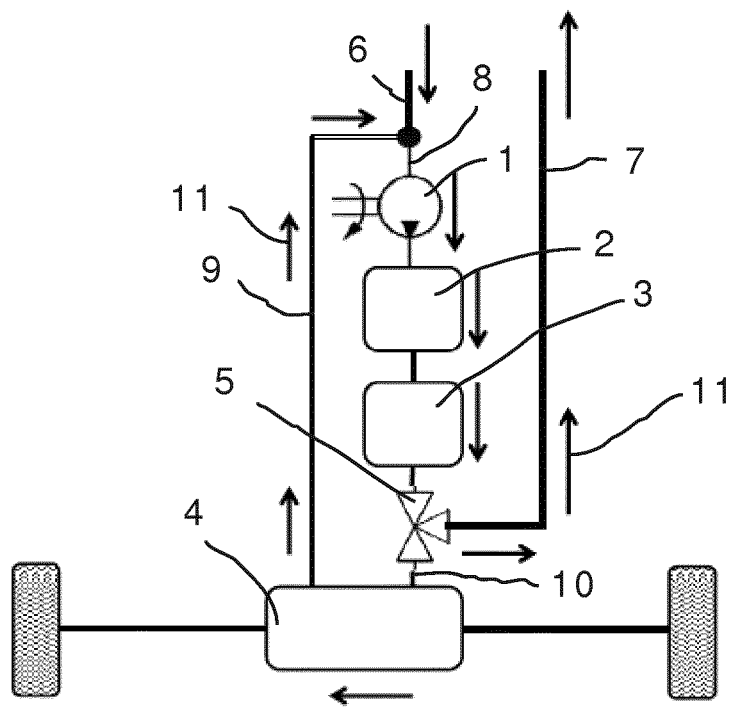

In order to cool the transmission of the axle 4 the three way valve 5 diverts the incoming flow from the first flow line 8 to the outgoing flow line 7 and to the third flow line 10, leading to the axle 4. During this operation mode the temperature of the coolant flow is to be kept below the temperature limits of the power electronics 2 and the electrical machine 3. The direction of flow of the coolant during this operation mode is indicated by arrows 11 in FIG. 4.

Figure 5:
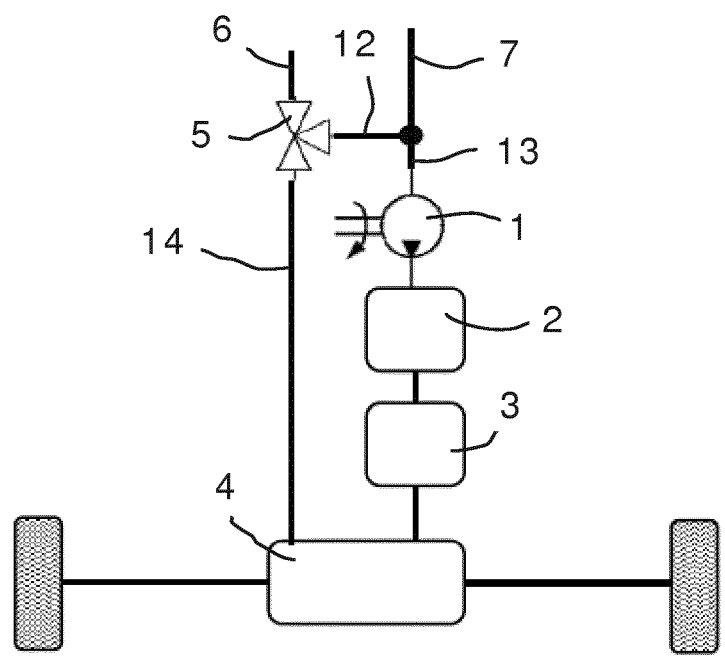
FIG. 5 is a circuit diagram of a further embodiment of the thermal management system of the present invention.

In the alternative embodiment shown in FIG. 5 the three way valve 5 is placed directly in the incoming flow line 6. The three way valve 5 is also connected to a first flow line 12, which first flow line is connected both to the outgoing flow line 7 and a second flow line 13 leading to the coolant pump 1. Further, the three way valve 5 is connected to a third flow line 14 leading to the axle 4. By this arrangement the axle 4 is always included in the circuit. By controlling the three way valve 5 the coolant is either circulated within the circuit, for heating up the axle 4, or returned to the cooling system of the vehicle, for cooling. This arrangement will increase the demands on the cooler of the vehicle, since heat from the axle 4 always need to be cooled off to provide a low enough return temperature for the power electronics 2.

Figure 6:
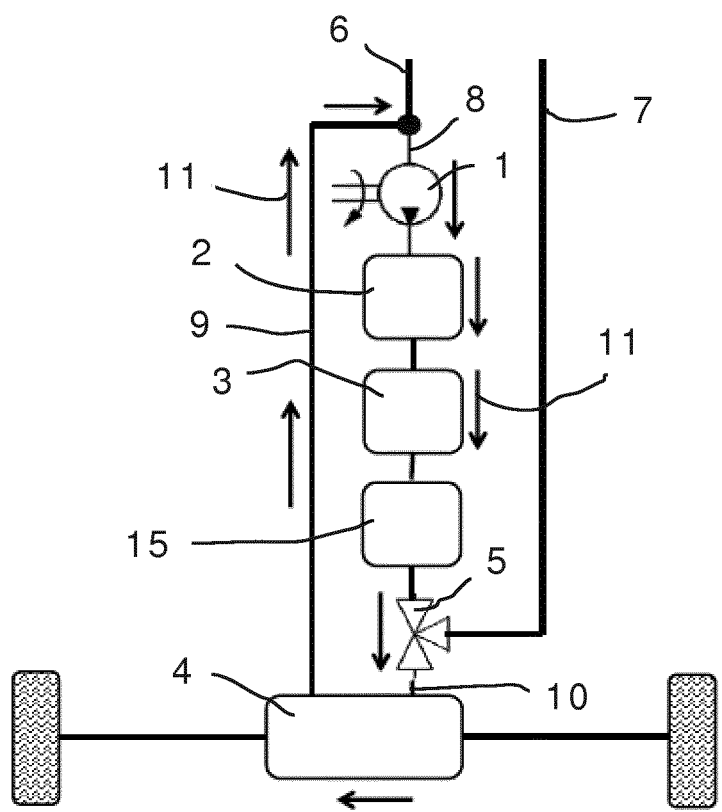
FIG. 6 is a circuit diagram of still a further embodiment of the thermal management system of the present invention.

Also other heat sources beside the ones shown in FIGS. 1-5 may be used to heat the transmission of the axle 4. This is exemplified in the embodiment of FIG. 6, where an on-board charger 15 is placed in the circuit. In the shown embodiment the on-board charger 15 is placed between the electrical machine 3 and the three way valve 5. The embodiment of FIG. 6 functions in a similar fashion as already described in relation to FIGS. 1-4 and will therefore not be repeated here. One benefit of placing the on-board charger in the circuit is that the transmission of the axle 4 can be heated when charging and thus start at an elevated temperature already when starting to drive.

The invention claimed is:

1. A method of thermal management of a transmission of an axle of an electrical vehicle, comprising using coolant of a cooling system of the vehicle to pick-up heat losses from one or more on-board units comprising flowing the coolant through the one or more on-board units before passing through the transmission of the axel, and wherein the one or more on-board units comprises at least one of power electronics, an electric machine, a battery or an on-board charger, wherein the method of thermal management comprises:

heating the transmission of the axle by a heating mode in which the coolant is made to go in a closed circuit through the one or more on-board units and the transmission of the axle whereby the coolant flow picks up heat from the one or more on-board units to heat up the transmission of the axle, cooling the transmission of the axle by a cooling mode in which the coolant is divided into a flow going via the axle and a flow going directly to an outgoing flow line, wherein the temperature of the coolant flow is kept below temperature limits of the one or more on-board units, and bypassing the transmission of the axle by a normal drive mode in which the coolant is lead past the axle, wherein the temperature of the transmission of the axle is close to its operating temperature and higher than the temperature limits of the one or more on-board units.

2. The method of claim 1, wherein the thermal management has three different operation modes including the heating mode, a cooling mode and a mode for normal driving.

3. The method of claim 2, wherein in the cooling mode the coolant is divided into a flow going via the transmission of the axle and a flow going direct do an outgoing flow line.

4. The method of claim 2, wherein in the mode for normal driving the coolant is lead by-pass the transmission of the axle.

5. The method of claim 1, wherein oil is used as the coolant fluid.

6. A method of thermal management of a transmission of an axle of an electrical vehicle, comprising using coolant of a cooling system of the vehicle to pick-up heat losses from one or more on-board units comprising flowing the coolant through the one or more on-board units before passing through the transmission of the axel, wherein the coolant is circulated by means of a coolant pump, wherein a three way valve is used to shift between the different operation modes and wherein heat losses of at least one of power electronics, an electric machine, a battery or an on-board charger are used, wherein the method of thermal management comprises heating the transmission of the axle by a heating mode in which the coolant is made to go in a closed circuit through the one or more on-board units and the transmission of the axle whereby the coolant flow picks up heat from the one or more on-board units to heat up the transmission of the axle, cooling the transmission of the axle by a cooling mode in which the coolant is divided into a flow going via the axle and a flow going directly to an outgoing flow line, wherein the temperature of the coolant flow is kept below temperature limits of the one or more on-board units, and bypassing the transmission of the axle by a normal drive mode in which the coolant is lead past the axle, wherein the temperature of the transmission of the axle is close to its operating temperature and higher than the temperature limits of the one or more on-board units.

7. The method of claim 6, wherein water is used as the coolant fluid.

8. A circuit used in a method of thermal management of a transmission of an axle of an electrical vehicle, comprising using coolant of a cooling system of the vehicle to pick-up heat losses from one or more on-board units comprising flowing the coolant through the one or more on-board units, wherein the cooling system comprising a coolant pump, the one or more on-board units, a three way valve and the transmission of the axle, wherein the more on-board units comprises at least one of power electronics, an electric machine, a battery or an on-board charger, wherein the method of thermal management comprises a heating mode in which the coolant is made to go in a closed circuit through the one or more on-board units and the transmission of the axle whereby the coolant flow picks up heat from the one or more on-board units to heat up the transmission of the axle, cooling the transmission of the axle by a cooling mode in which the coolant is divided into a flow going via the axle and a flow going directly to an outgoing flow line, wherein the temperature of the coolant flow is kept below temperature limits of the one or more on-board units, and bypassing the transmission of the axle by a normal drive mode in which the coolant is lead past the axle, wherein the temperature of the transmission of the axle is close to its operating temperature and higher than the temperature limits of the one or more on-board units.

9. The circuit of claim 8, wherein an incoming flow line is connected to a cool side of the cooling system of the vehicle, wherein the incoming flow line is diverted into a first flow line and a second flow line, wherein the first flow line is connected to the coolant pump, the one or more on-board units and the three way valve, and wherein the second flow line is connected to transmission of the axle.

10. The circuit of claim 9, wherein the three way valve an outgoing flow line and a third flow line going to the axle, wherein the three way valve is placed in the first flow line downstream of the coolant pump and the one or more on-board units, and wherein the outgoing flow line is connected to a hot side of the cooling system of the vehicle.

11. The circuit of claim 9, wherein the three way valve is connected to an incoming flow line from the cool side of a cooling system of the vehicle, to a first flow line and to a third flow line, wherein the first flow line is diverted to a second flow line and an outgoing flow line, wherein the outgoing flow line is connected to a hot side of the cooling system of the vehicle and wherein the coolant in the second flow line goes via the coolant pump and the one or more on-board units to the axle.

\* \* \* \* \*